United States Patent

[11] 3,604,890

| | | |
|---|---|---|
| [72] | Inventors | George J. Mullaney<br>Seattle;<br>John M. Webster, Tukwila, both of, Wash. |
| [21] | Appl. No. | 866,549 |
| [22] | Filed | Oct. 15, 1969 |
| [45] | Patented | Sept. 14, 1971 |
| [73] | Assignee | The Boeing Company<br>Seattle, Wash. |

[54] MULTIBEAM LASER-JET CUTTING APPARATUS
12 Claims, 3 Drawing Figs.

[52] U.S. Cl. .......................................................... 219/121 L
[51] Int. Cl. ............................................................ B23k 9/00
[50] Field of Search............................................ 219/121,
68, 70; 331/94.5

[56] References Cited
OTHER REFERENCES

Welding Handbook, American Welding Society, 1942, pgs. 675, 688, 693.

" Theory and Application of Pulsed Laser Welding," Welding Journal, Dec. 1965, pgs. 1018– 1026.

*Primary Examiner*—J. V. Truhe
*Assistant Examiner*—Lawrence A. Rouse
*Attorney*—Christensen, Sanborn & Matthews ABSTRACT: A multibeam laser-oxidizer system which optimizes the cutting performance of a laser cutting tool. Two laser beam systems of different focal length are focused on substantially the same area of the material to be cut. The beam of shortest focal length provides a preheat zone with the short depth of focus and small spot size (compared to the second beam) serving to bring the material to a temperature such that a jet of oxidizing gas applied to the heated spot gives rise to the initiation of the cut. The long focal length lens system concentrates the radiant energy of the second beam over a large depth of focus compared to the preheat beam and as a result a uniform cut through a substantial thickness of material is achieved. Details of the lens systems and cutting toolhead are provided together with details of gas flow openings in the cutting tool for supplying both oxidizing and inert shield gases to the cutting area.

INVENTORS:
GEORGE J. MULLANEY
JOHN M. WEBSTER

BY Christensen, Sanborn, & Matthews

ATTORNEYS

MULTIBEAM LASER-JET CUTTING APPARATUS

Various types of laser cutting tools have recently been developed with such cutting systems utilizing the intense radiant energy capabilities of the laser alone for cutting materials, particularly thin-gage materials. In the case of materials which are not only expensive to buy but also to process it is important to reduce the amount of material wasted due to width of the kerf and also to provide a cut having a surface condition such that edge cleanup requirements are reduced. Thus it is an object of the present invention to provide an improved cutting tool adapted for cutting various materials, metallic and nonmetallic, wherein the width of the kerf can be controlled and maintained relatively small.

Another object of the present invention is to provide a laser cutting tool making use of a plurality of laser beams focused on a common spot through the use of lens systems of different focal length for the different beams.

Another object of the invention is to provide a laser cutting tool which utilizes the advantageous characteristics of a focused laser beam with the advantages of a jet of oxygen, another oxidizer, or an inert gas for maintaining the cutting operation.

Another object of the present invention is to provide a shielded laser-jet cutting beam through the use of a system wherein a plurality of lens systems of different focal length serve to focus a plurality of laser beams on substantially the same area with a jet of oxidizing gas surrounded by an inert gas being applied to the area to be cut.

A further object of the present invention is to provide novel cutting heads for a laser-jet cutting tool system.

The above and additional objects are achieved through the use of a system wherein a relatively short focal length lens system focuses a first laser beam on the area of relatively small size on the surface of the material to be cut. At the same time one or more additional lens systems focus one or more additional laser beams on substantially the same area but with the additional laser beams being associated with lens systems of longer focal length so that intense radiation is provided at one or more locations below the surface of the material to be cut. Thus a narrow kerf having relatively smooth walls is achieved due to the beam arrangements and the parallel flow of an oxidizing or inert gas through a sonic nozzle with a free expansion to supersonic flow or supersonic contoured nozzle onto the material being cut. In one specific system a sonic flow of oxidizing or inert gas is provided along with the laser beam passing through the short focal length lens system while a supersonic flow is provided along the longer focal length laser system. The result is found to be that a narrow kerf is achieved in the one case as a result of the combined thermochemical reaction due to oxidation in combination with the heat supplied by the laser system. In the case of the inert gas jet the laser again controls the narrow kerf and the inert gas propagates the cutting action far beyond the material surface.

These and other advantages and objects will be more clearly understood from the following description when read with reference to the accompanying drawings wherein FIG. 1 is a cross-sectional view of a preferred embodiment of the invention making use of two laser beams and associated lens systems.

Figure 1:
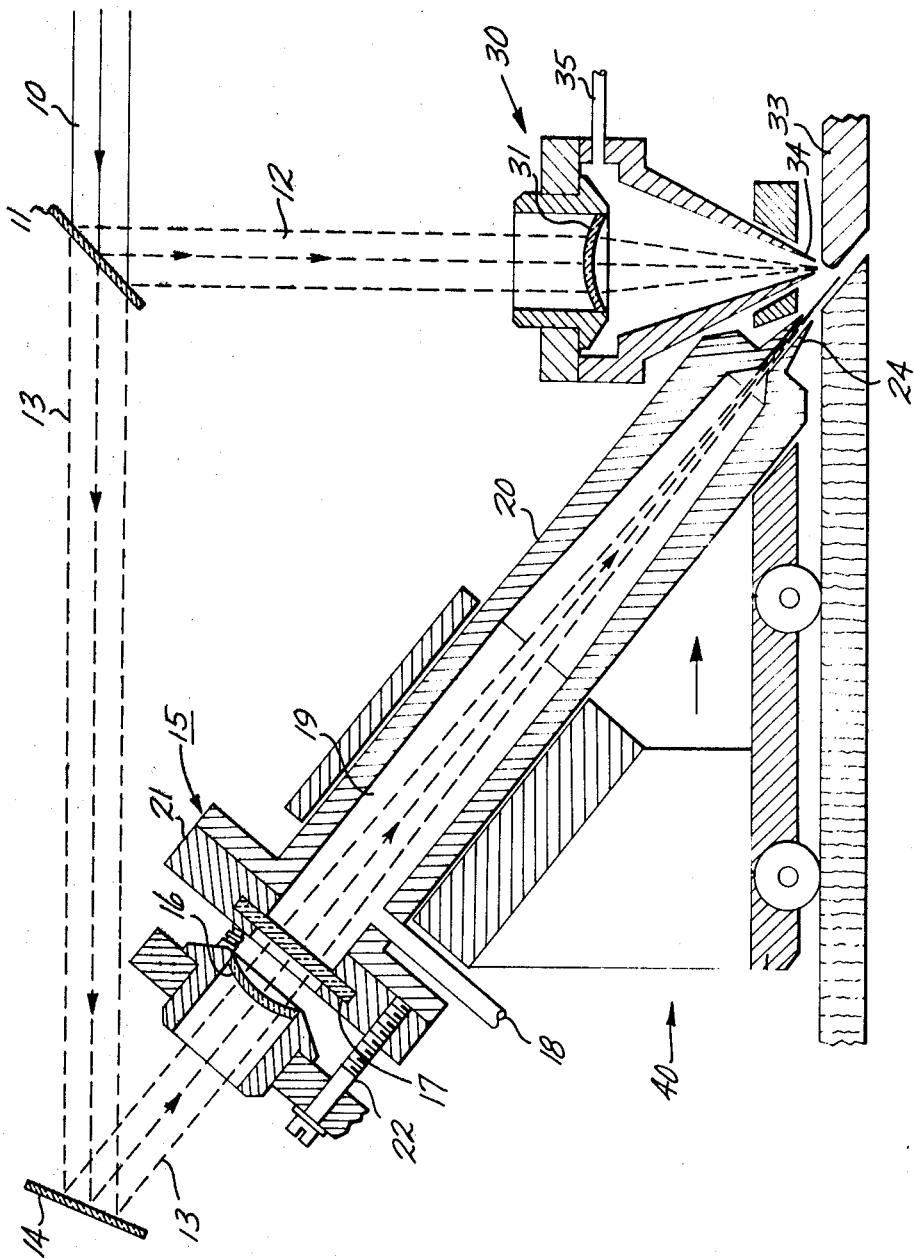

Turning now to the drawings, it will be seen that a laser beam 10 impinges on a partially silvered reflecting surface 11 so that it is split into the separate beams 12 and 13. These two beams 12 and 13 are then focused by the two lens systems of cutting heads 15 and 30. The lens system of head 15 is of a long focal length by comparison to the focal length of the system in head 30. The laser beam energy passing through the system of head 30 initiates the reaction since its lens 31 disposed inside the housing 32 focuses the beam 12 substantially on the surface of the material 33 being cut. The tapered end 34 of the head 30 has the exit opening thereof so designed that an oxidizing or inert gas entering the tubular inlet 35 exits from the end 34 in a sonic or supersonic or supersonic flow arrangement.

Beam 13 is reflected by a suitable reflecting surface 14 so that the beam 13 passes through the lens system of the head 15. The lens system of the cutting head 15 includes not only the lens 16 but also the germanium window 17 which provides a high percentage of transmission of the laser beam. The cutting head 15 includes an oxidizer or inert gas input tube 18 which communicates with the hollow interior 19 of the elongated tubular member 20. The lens system 16 is adjustably secured to the top plate 21 of the head 15 by means of adjustable screws 22. The lower end of the tubular body 20 is elongated as at 24 with the opening in the elongated portion 24 being designed so that the oxidizing or inert gas entering the head by way of the tube 18 exits from the end 24 in a sonic or supersonic flow.

It will be seen that the focal length of the cutting-head assembly 30 is shorter than the focal length of the lens system associated with the cutting head 15. Thus the energy of the laser beam 12 is primarily focused on a small area of the surface of the material 33 while the energy of the second laser beam 13 is focused for optimum cutting of the material 33. One of the advantages of the multibeam laser system is that the energy absorption of the second beam is enhanced because the moltenvaporized material processed by the first beam provides a region of reduced reflectivity for the second laser beam.

In cutting sheet material it is advantageous to have the head assemblies 30 and 15 mounted on the coordinate-drive carriage assembly 40 for permitting relative movement between the sheet material 33 and the cutting heads.

The short focal length lens system of the cutting-head assembly 30 together with the laser beam 12 can be referred to as the preheat or initial cut laser system in that it serves to preheat the surface of the material and initiate a limited oxidation reaction or melting. In a typical application the preheat laser system would concentrate something in the order of 200 kilowatts per square centimeter per 100 watts of laser power available. For metals which are difficult to cut because of their transport properties and thermochemistry, a finely pulverized metal could be carried by the oxidizer stream to enhance the reaction rate at the beam focal point which is on the surface of the material being cut. For example, a pulverized metal such as iron powder can be utilized when stainless steel is being cut. Titanium powder can enhance the operation for cutting other alloys. Cutting of aluminum alloys could be enhanced by adding iron oxide, one form of which is given by $Fe_3O_4$. In the use of iron oxide one takes advantage of the laser energy absorption by the $Fe_3O_4$ and the chemical reaction given by:

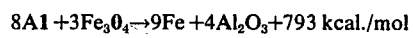

$$8Al + 3Fe_3O_4 \rightarrow 9Fe + 4Al_2O_3 + 793 \text{ kcal./mol}$$

to produce a high temperature sufficient to melt the aluminum. In addition, it will be seen that an inert dilutant can be added to the oxidizer to reduce the reaction rate when the material being cut is very easy to cut and the rate of motion of the material fed to the cutting system is limited.

The final cut in the multiple laser-jet cutting system is provided by the head assembly 15 and the laser beam 13. This cutting head would typically concentrate 10 to 15 kilowatts per square centimeter for each 100 watts of power, over a large depth of focus compared to the preheat beam assembly. The large depth of focus helps create a uniform cut, particularly with thick materials. A uniform parallel flow supersonic nozzle is shown in FIG. 1 as being part of the cutting head 15. In operation it is found that the supersonic jet of oxidizing gas exiting from the end 24 is bounded on three sides by molter metal walls. If extremely thick sheets of metal are to be cut a series of laser-jet assemblies each focusing at a different depth of the material to be cut can be utilized.

Figure 2:
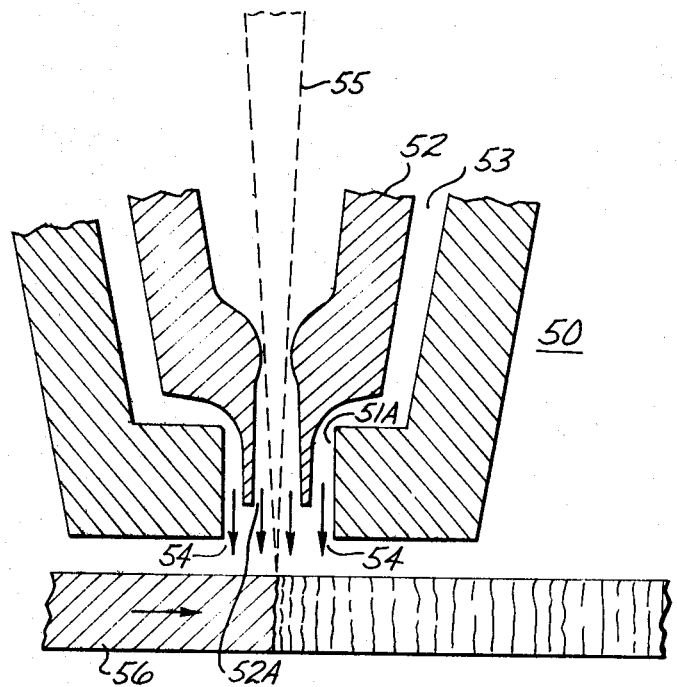
FIG. 2 is a cross-sectional view of a novel head for a laser cutting tool making use of an oxidizing gas and an inert gas for shielding the area being cut.

In FIG. 2 an alternate cutting head assembly 50 is illustrated as including an outer cylinder 51 having an end opening 51A with the cylinder 51 being disposed about the inner cylinder 52. The opening 53 between the two cylinders defines a cylindrical channel for the flow of an inert gas such as argon indicated generally by the arrows 54. The inner cylinder 52 is hollow and has suitable connections for receiving an oxidizing gas such as oxygen which exits from the opening 52A. A laser beam 55 is focused by a suitable assembly (not shown) so that the energy of the laser beam is focused at the appropriate location on the material 56 which is being cut. The cutting-head assembly of FIG. 2 is particularly advantageous when cutting thin-gage sheet material such as titanium where the requirement to reduce cutting speeds when negotiating corners or contours with small radii will not result in widening of the kerf and heat-affected zones. If the relative motion between the laser spot and the component to be cut is reduced to zero then the oxidation reaction will be presented by the introduction of inert gas along the walls of the kerf. Thus a self-regulating system is provided.

Figure 3:
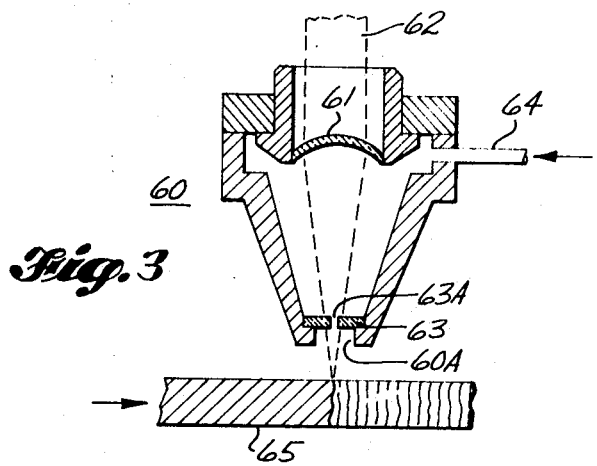
FIG. 3 is a cross-sectional view of an alternate cutting toolhead adapted for use in carrying out the teachings of the present invention.

In the arrangement of FIG. 3 the cutting head 60 is provided with a lens 61 for focusing the laser beam 62 onto the surface of the workpiece 65. The lower opening 60A of the head 60 has a dielectrically coated germanium plate (for optimum transmission if a $CO_2$ laser is used) 63 disposed therein with the plate 63 having a hole 63A provided therein. The hole may have any shape to optimize the cutting process. Thus an oxidizing or inert gas which enters through the tube 64 in the head 60 exits through the opening 63A and is applied to the workpiece 65. It will be noted that such an arrangement simplifies the problem of system alignment since the laser beam 62 easily passes through the germanium plate 63 and thus the opening 63A therein need not be exactly aligned with the optical axis of the lens system. Other suitable materials which are sufficiently transparent to the particular laser beam being used will suffice for the plate 63.

While various types of lasers can be utilized for carrying out the teachings of the present invention a carbon dioxide laser operating at 10.6 microns wavelength is suitable. In the case of metals which are difficult to heat pulsed laser power can be utilized. Thus a pulsed $CO_2$ or a YAG solid-state pulsed laser could be utilized. The former has a wavelength of 10.6 microns whereas the latter has a wavelength of 1.06 microns. The important factor is energy absorbed by the work per unit volume. It is well known that laser focusing is proportional to coherent beam wavelength. The repetition rates of YAG lasers are greater than the pulsed $CO_2$ lasers and can be focused to a smaller spot size. With low cutting speeds the oscillatory nature of a pulsed laser would not be objectionable when the frequency is several thousand cycles per inch of cut.

There has thus been disclosed an improved technique and apparatus for cutting materials such as metals using the combined advantageous features of a laser beam and an oxidizing or inert jet of a suitable gas.

What is claimed is:

1. A laser cutting system comprising in combination laser means providing first and second beams of radiant energy; first head means including a first lens system in the path of said first beam and having a first focal length for focusing said first beam on a point lying substantially at the surface of an object to be cut, and second head means including a second lens system having a focal length which is longer than said first focal length and positioned to direct said second beam onto said point and over a depth of focus larger than the depth of focus of said first beam said system when operated having the first and second beam impinging on said point at substantially the same time.

2. A system as defined in claim 1 including means supporting said lens systems for simultaneous movement relative to a workpiece and maintaining said lens systems fixed relative to each other.

3. The system of claim 1 including means directing a flow of gas onto said area.

4. The system of claim 1 wherein at least one of said head means includes gas jet means having a gas discharge opening aligned with the associated beam with the beam passing therethrough and operative to direct pressurized gas onto the area where said beam is focused.

5. The system of claim 1 wherein each of said first and second head means includes gas jet means having a gas discharge opening aligned with the associated beam and each is operative to direct pressurized gas onto the area where the associated beam is focused.

6. A system as defined in claim 4, wherein said one head means includes a piece of germanium having said discharge opening provided therein.

7. A method of cutting material comprising the steps of focusing a first laser beam on a first spot which is substantially on the surface of the material using a lens system having a first focal length, and focusing a second laser beam at substantially the same time on a second portion of the material which is beneath the surface of the material and substantially in line with said first spot using a lens system having a focal length which is greater than said first focal length.

8. The method of claim 7 including the step of applying a noninert gas to the focal area of at least one of said beams.

9. The method of claim 8 including the step of maintaining a column of inert gas about the noninert gas.

10. The method of claim 7 including the step of applying an inert gas to the kerf of the material as the cutting action occurs.

11. The method of claim 7 including the step of applying oxygen to the said first area along a path substantially parallel to the path of said first beam.

12. The method of claim 11 including the step of applying oxygen to said second portion of material along a path substantially parallel to the path of said second beam.